May 26, 1931. J. F. STUBNER 1,807,327
STEREOPTICON
Filed May 5, 1927 9 Sheets-Sheet 8

Witness:
William P. Kilroy

Inventor:
John F. Stubner
By John J. McLaughlin

Patented May 26, 1931

1,807,327

UNITED STATES PATENT OFFICE

JOHN F. STUBNER, OF CHICAGO, ILLINOIS, ASSIGNOR OF ONE-THIRD TO ALBERT BESSER AND ONE-THIRD TO MAX J. OLSHANSKY

STEREOPTICON

Application filed May 5, 1927. Serial No. 188,915.

My invention relates to optical projecting machines.

It relates more in particular to an improved light, portable projecting machine or stereopticon adapted to be operated automatically for display or advertising purposes, or to be semiautomatically operated so that the period of exposure of a given slide may be varied in accordance with the wishes of an operator, for example a lecturer.

The principal object of my invention is the provision of an improved automatic projecting machine.

Another object is to provide a projecting machine adapted to be operated automatically for advertising or display purposes.

Another object is to provide a projecting machine which may be automatically and continuously operated, or the operation controlled in accordance with the wishes of a lecturer, without any modification of the equipment.

Another object is to produce a projecting machine, the entire operation of which may be controlled by a lecturer without assistance.

Another object is to provide a projecting machine in portable form which needs no adjustment to be operated by a lecturer, but which, after being connected with a source of power may be immediately used to illustrate a lecture.

Another object is to provide a projecting machine wherein the slides are contained in proper order within the body of the machine and are exposed singly, and conveyed in proper order so that a group of slides may be shown repeatedly without adjustment of the machine and will always appear in the same order.

One form which the invention may take is shown in the accompanying drawings, wherein—

My stereopticon is adapted to be operated continuously and automatically so that it can be used for continuous advertising or display purposes; or it may be employed to illustrate a lecture or the like, the time of projection of the individual slides being controlled by the mechanism, in other respects operated entirely automatically.

My projecting machine is entirely portable so that nothing remains for an operator to do, but to connect it to a source of electric power and put it in operation by the control of the usual electric switch. The slides are stored in a magazine which is part of the structure of the machine, and they are returned to the magazine after projection so that after showing a group of slides, they are in a position to be again projected, and will appear in the same order.

The source of light provided is an electric bulb of sufficient capacity with a properly arranged reflector for directing the light thereof, toward the usual condenser lenses whence the light is directed in a single narrow beam through a suitable focusing lens or lenses, onto a screen.

A magazine containing a plurality of slides, is mounted above the light beam, and the slides are adapted to be fed one at a time, from the magazine into the path of the light beam between the condenser and the focusing lenses. As each slide is brought into projecting position, it causes the ejection of a slide from the projecting position. The ejected slide passes down an inclined chute and is introduced to a circular track around which it is propelled to the rear of the magazine and engaged by a pair of lifter arms and raised to an upright in the back of a magazine.

Figure 1:
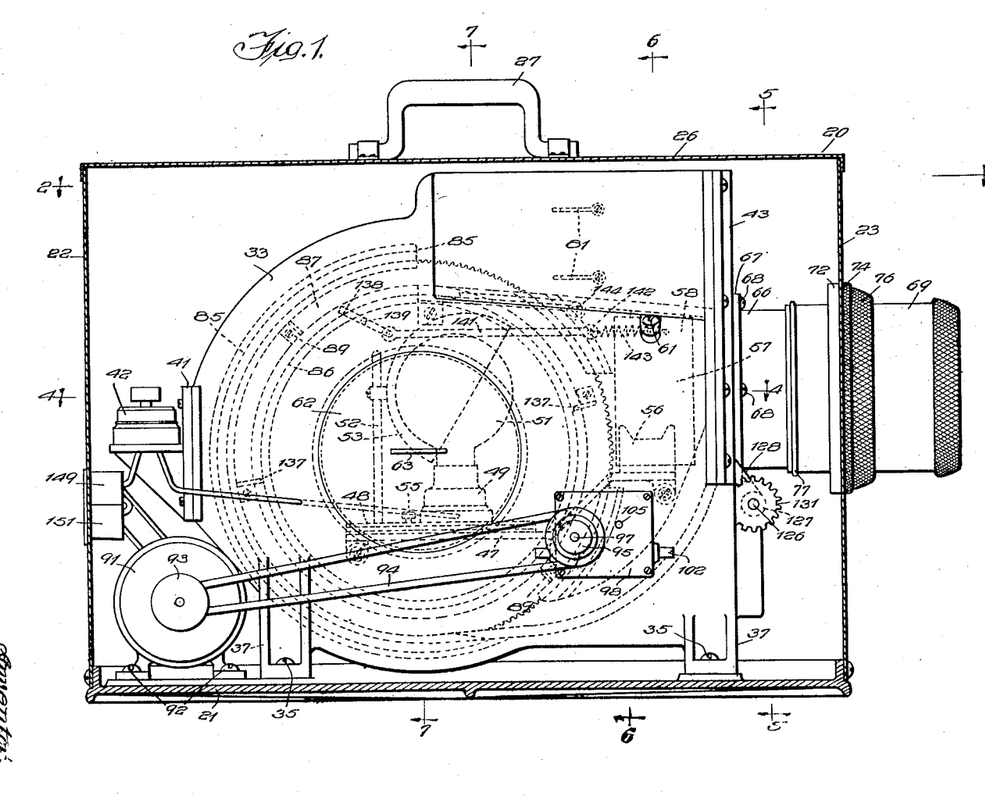
Fig. 1 is an elevational view with the outside casing shown in section, and the body of the mechanism shown in elevation.
Figure 2:
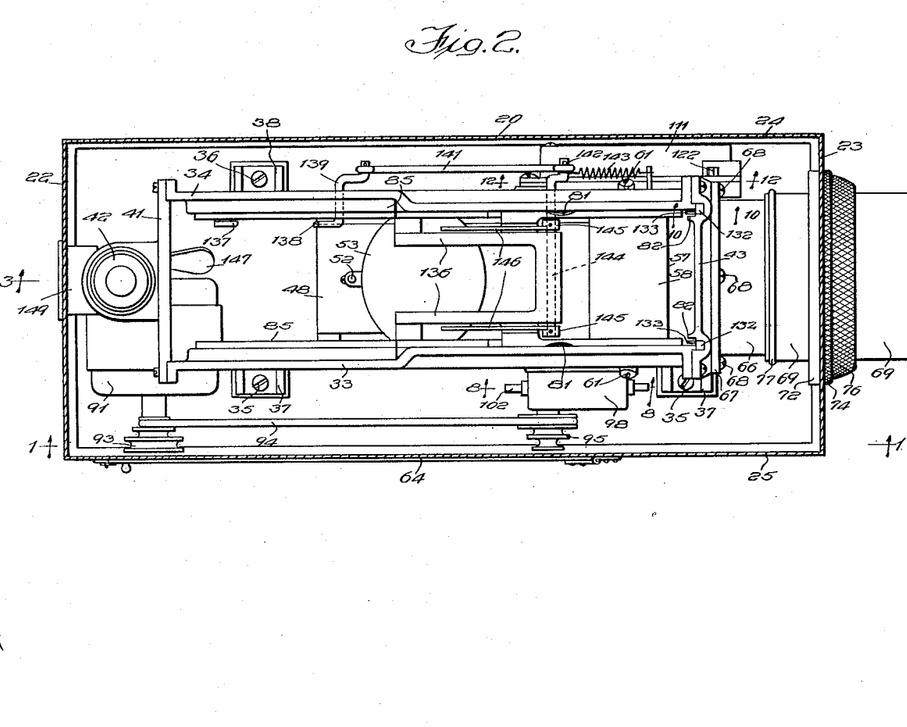
Fig. 2 is a plan view such as shown by sectioning the casing along the line 2—2 of Fig. 1.
Figures 3, 19:
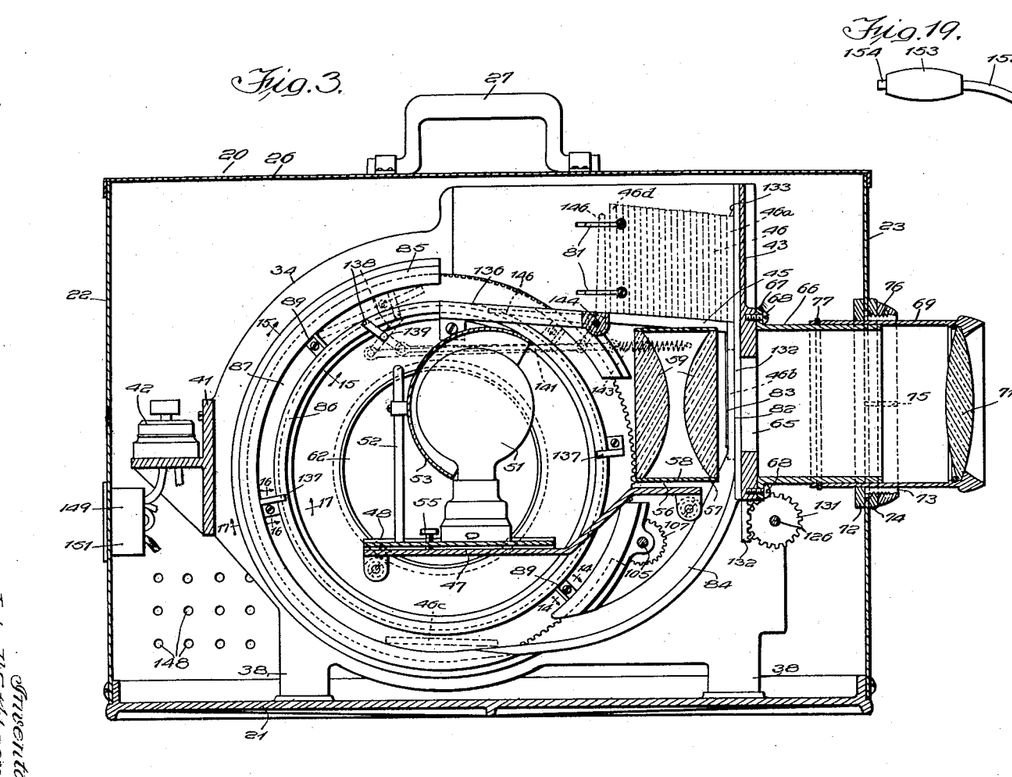
Fig. 3 is a longitudinal central sectional view along the line 3—3 of Fig. 2.
Fig. 19 is a schematic showing of the push button switch for distant control thereof.
Figure 6:
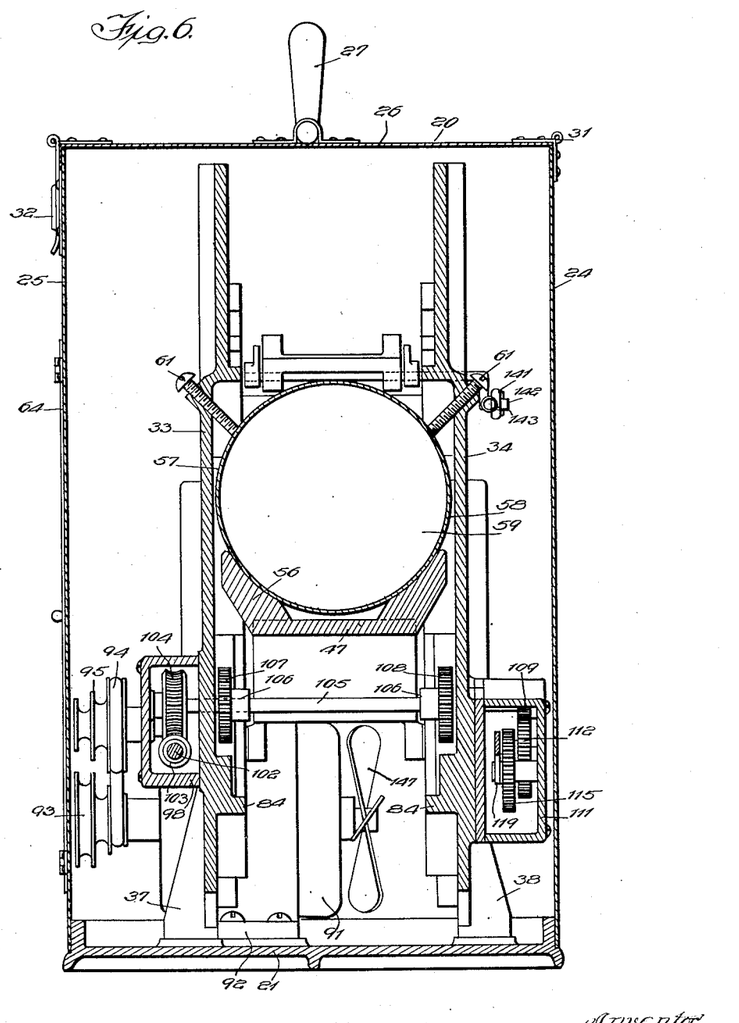
Fig. 6 is a vertical section on line 6—6 of Fig. 1.
Figure 7:
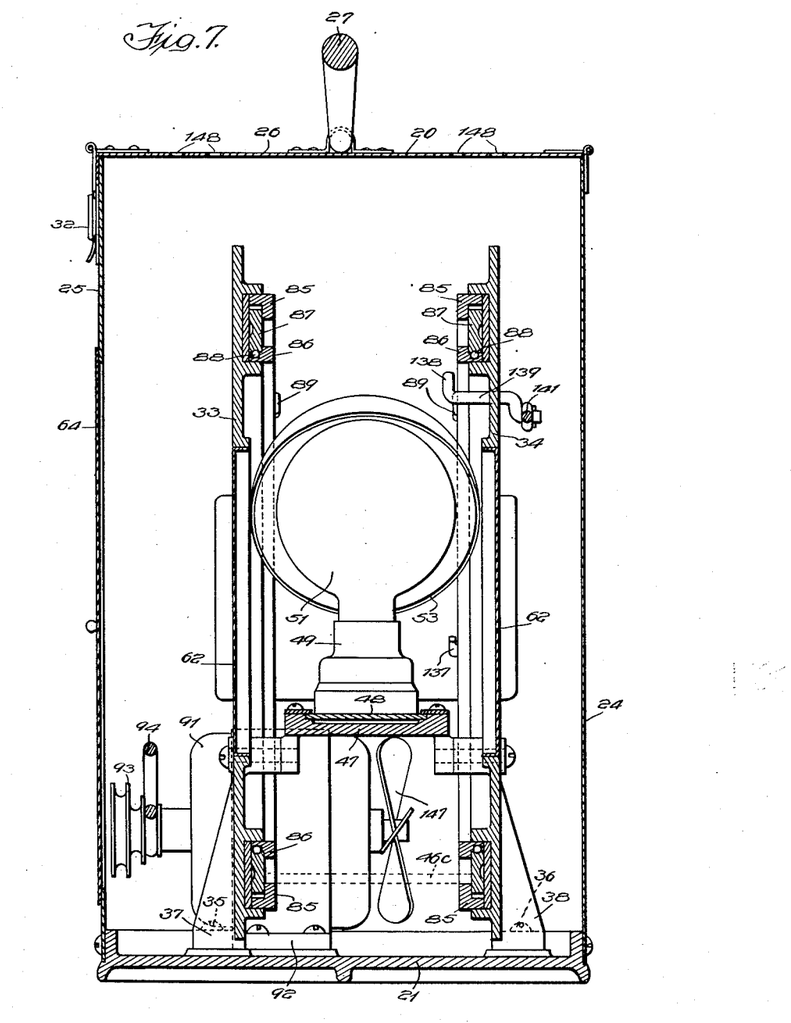
Fig. 7 is an irregular vertical section taken approximately along the line 7—7 of Fig. 1.

Reference may now be had to the accompanying drawings, particularly Figs. 1, 2 and 3, for the time being, wherein like reference characters are employed throughout, to designate similar members. The stereopticon is adapted to be housed in a valise-like box or cabinet 20 which comprises a bottom 21, ends 22 and 23, sides 24 and 25 and a top 26. The bottom 21 serves as the base plate for mounting the main portions of the apparatus and is suitably ribbed and thickened in various ways, to add the necessary strength and body thereto. The top is provided with a bail handle 27 and the entire top is hinged at 31 (Figs. 1, 6 and 7) to be readily opened. Any usual fastening means 32 holds the top normally in position and prevents its opening thereof.

Figure 5:
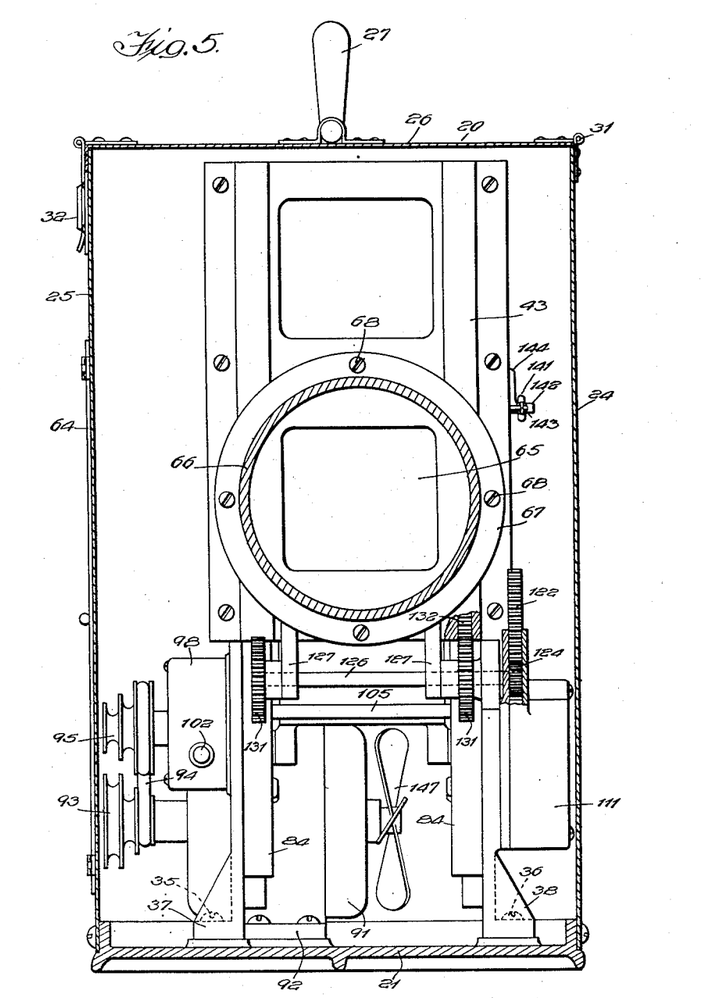
Fig. 5 is a vertical sectional view along the line 5—5 of Fig. 1, the front portion being shown in elevation.

The main framework of the stereopticon comprises a pair of upright plates 33 and 34 (Figs. 1 and 2) held in upright position by screws 35—35 and 36—36 extending through integral leg portions 37—37 and 38—38 respectively. These plates are spaced by a rear bracket 41 on which is mounted an electric switch 42, and by a front apertured plate 43 (Fig. 5) which has a number of functions which will be described. A substantially horizontal plate 45 supports a plurality of slides 46—46, and inflared sections 45' of the two upright plates 33 and 34 cooperate with the horizontal plate 45 to form a magazine for containing the slides 46.

A centrally disposed transverse spacing plate 47 (Figs. 1 and 3) has in slidable engagement therewith, a horizontal mounting plate 48 for a lamp assembly, comprises a plug 49 adapted to support a bulb 51, and an upright 52 supporting a reflector 53. The horizontal mounting plate 48 is slidably supported on the centrally disposed transverse plate 47 so that the position of the source of light with respect to the lenses, may be varied. Any suitable construction is provided for securing the lamp assembly against movement, and a set screw 55 is adapted to hold the two plates 47 and 48 to prevent relative movement therebetween.

The front portion of the centrally disposed transverse mounting plate 47, forms a saddle 56 which is adapted to support a condenser 57, the condenser comprising a circular casing 58 and a pair of condenser lenses 59. The condenser is held in position by a pair of set screws 61—61 extending through the upright plates 33 and 34, and having their ends engaging the condenser casing.

The upright plates 33 and 34 are centrally apertured for lightness and to afford means of communication to the lamp assembly. In each central aperture is provided a light cover 62, which is held in the opening in the plate by friction alone, and is provided with an upraised portion 63 to facilitate removal thereof. This is an optional construction, although not necessary because the lamp can be reached through the top of the outside casing when it is swung back on the hinges 31. I prefer this construction and when it is employed, I also place a door 64 in the side 35, thus affording access to the friction held cover 62, and other portions of the apparatus which will be described.

The front plate 43 (Fig. 5) has a square aperture 65 in the path of the beam of light from the condenser 57 and a circular casing 66 having a flange 67, is secured to the front plate 43 by screws 68—68 so as to cover the opening 65. A tubular casing 69 having a focusing lens 71 secured therein is telescoped on the circular casing 66 and extends through the front 23 of the outside box or casing. A spherical opening is formed in the front 23 where the tubular casing 69 extends therethrough, and the material is strengthened in the region of the opening by a collar 72 having a threaded projection 73 extending through the hole on which is threaded a nut 74. The edge of the end 23 in the region of the opening therein, is therefore clamped between the collar 72 and the nut 74. The threaded portion of the collar is split as at 75, and a nut 76 is adapted to press the threaded portion together and clamp it on the outside of the tubular casing 69. By this means, the focus can be adjusted and the movable tubular casing 69 secured against accidental movement. An annular ring 77 secured around the inside end of the movable tubular casing, prevents this casing from being entirely removed from the outside.

Figure 4:
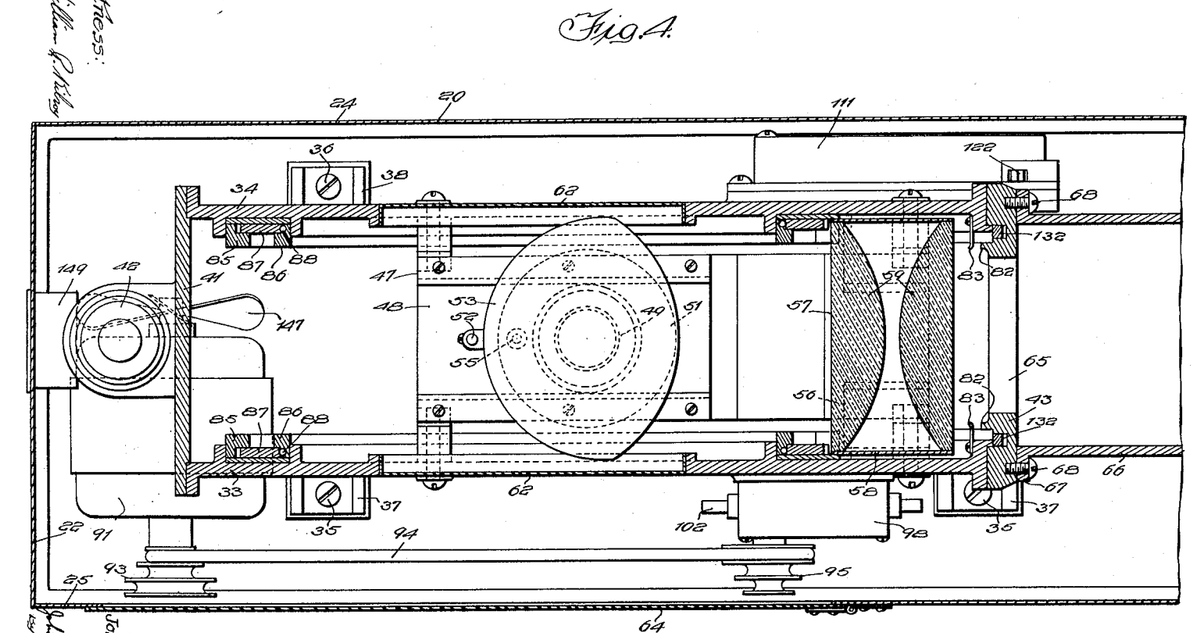
Fig. 4 is a plan section along the line 4—4 Fig. 1.

As described above, a magazine for the slides 46 is formed by the horizontal plate 45 with the two upright plates 33 and 34. The plates are held in an upright position by springs 81—81 secured on the plates 33 and 34. These springs resiliently support the rearmost of the slides in upright position, the front slide being held in upright position against a vertical track consisting of shoulders 82—82 on the inside face of the front plate 43. The foremost slide 46a is adapted to be withdrawn from the magazine in a vertical downward direction and supplant a slide 46b which is held in projecting position between the shoulders 82 and springs 83—83 (Fig. 4). (The manner in which slide 46a is caused to move downwardly, will be made manifest when the movable elements of the mechanism are described in detail.)

When the slide 46b is forced downwardly by the slide 46a, it drops on to a chute 84, communicating with a circular track formed of a pair of circular members 85—85 (Fig. 7) which are secured in the upright plates 33 and 34 and a pair of inner circular members 86. A pair of circular gears 87—87 are secured between these members making the circular track, and turn upon ball-bearings 88—88. A pair of pushers 89, one for each circular gear, engage the slide when it drops on to the circular track and convey it around the circular track to the magazine. At this point the slide is placed in the magazine in a manner to be described.

Figure 8:
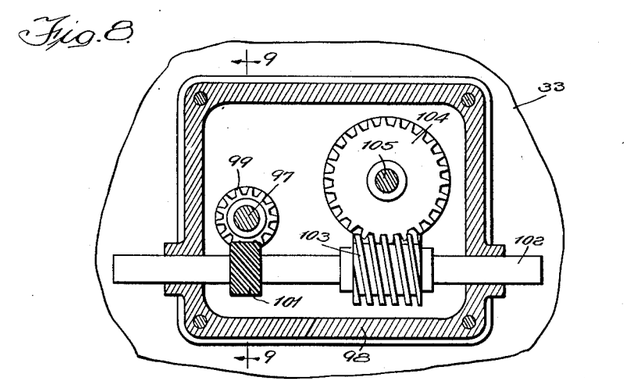
Fig. 8 is a detail of the driving mechanism such as would be taken along the line 8—8 of Fig. 2.
Figure 9:
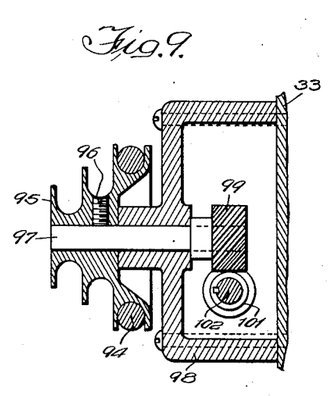
Fig. 9 is a section along the line 9—9 of Fig. 8.

Further details will be understood from a consideration of the means of driving the moving parts. An electric motor 91 is secured to the base plate by means of screws 92—92 and operates a variable speed drive pulley 93 which is connected by means of a belt 94, to a similar but reversed pulley 95. The pulley 95 is secured by means of a set screw 96 (Fig. 9) to a stud shaft 97 journaled in the housing of a gear box 98. The opposite end of the stud shaft carries a bevel gear 99 meshing with a bevel gear 101 (Fig. 8) on a shaft 102 which extends longitudinally through the gear box. The shaft carries with it, a worm 103 driving a worm gear 104 (Fig. 6) which is keyed to a transverse shaft 105. Shaft 105 extends through the upright plate 33, which is one wall of the gear box 98, and is journaled in suitable bearings 106, which are held by the centrally disposed transverse mounting plate 47. Shaft 47 has two spur gears 107 and 108 which mesh with and drive the two circular gears 87.

The details of the plate returning mechanism will be referred to again, but now the drive for the slide shifting mechanism must be described.

Figures 12, 18:
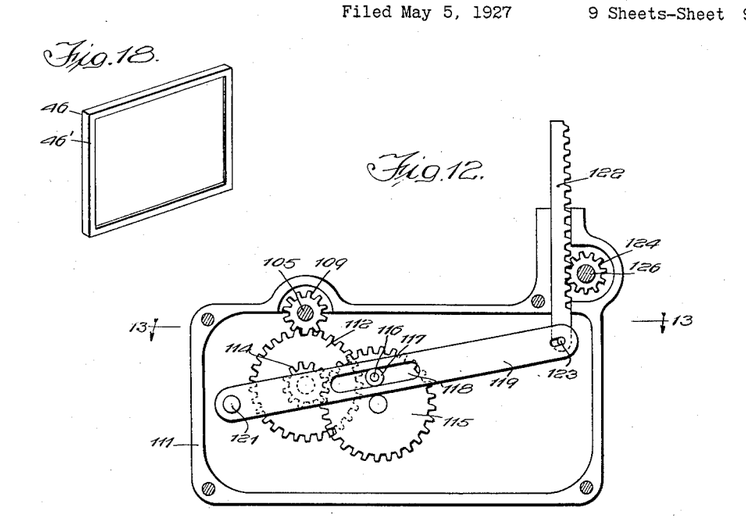
Fig. 12 is a sectional view through the slide controlling mechanism, the section being taken substantially along the line 12—12 of Fig. 2.
Fig. 18 illustrates one form of slide which is adapted for use with my projecting machine.
Figure 13:
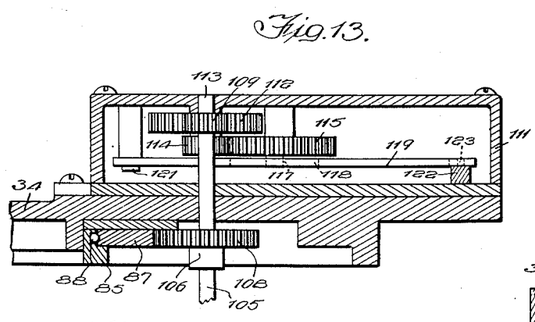
Fig. 13 is a section along the line 13—13 of Fig. 12.
Figure 14:
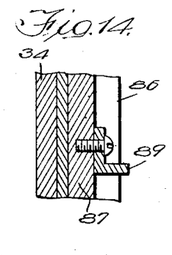
Fig. 14 is a section through one of the slide-pushers, the section being taken along the line 14—14 of Fig. 3.
Figure 15:
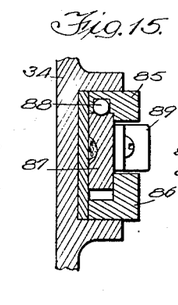
Fig. 15 is a section along the line 15—15 of Fig. 3, showing the slide-pusher in elevation.
Figure 16:
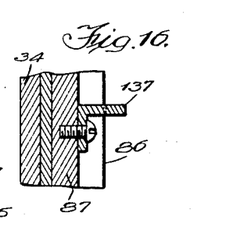
Fig. 16 is a section through a detail, the section being along the line 16—16 of Fig. 3.
Figure 17:
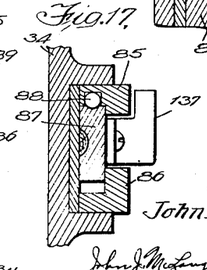
Fig. 17 is a section along the line 17—17 of Fig. 3.

At the end of shaft 105, a small spur gear 109 is secured, and turns therewith. This spur gear is within a housing 111, which contains certain other mechanisms for operating the slide shifter and may be referred to as the slide shifter gear box. The small spur gear 109 meshes with a larger spur gear 112 which is secured on a short shaft 113 journaled in the slide shifter gear box housing and which shaft carries therewith, a small spur gear 114 which meshes again with a larger gear 115 suitably supported in the gear box. Gear 115 has secured on one face thereof, a pin 116 carrying a roller 117 which is projected into a longitudinal slot 118 in a lever 119 which is pivoted to the housing at 121. On the free end of the lever 119, a short rack 122 is loosely pivoted by means of a pin 123. This short rack is slidable vertically in an extension of the housing 111 and meshes with a spur gear 124 (Figs. 5 and 12), which is keyed to one end of a transverse shaft 126 suitably journaled in bearings 127 supported in a pair of ears 128 integral with and projecting from the front plate 43. The shaft 126 has secured thereto, a pair of somewhat larger spur gears 131 which mesh with a pair of long vertically reciprocable racks 132 (Figs. 2, 3, 4 and 5).

Figure 10:
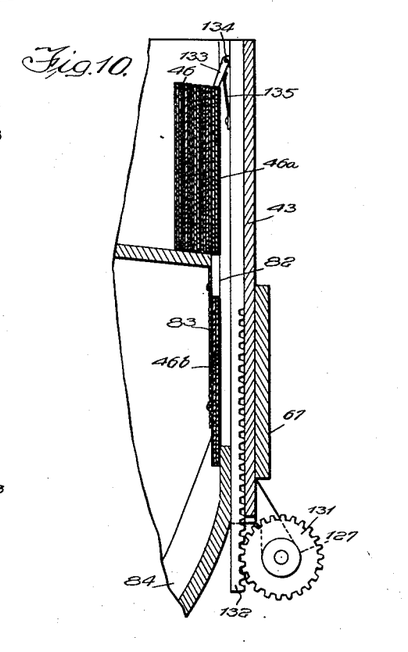
Fig. 10 is a fragmentary vertical section along the line 10—10 of Fig. 2 showing the manner of feeding slides.
Figure 11:
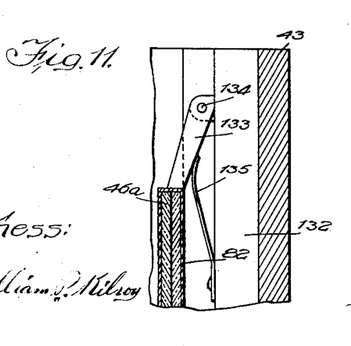
Fig. 11 is an enlarged view of a portion of Fig. 10.

Each of the vertically reciprocable racks 132 is supported in a channeled portion of the front plate 43 and has as its upper end, a pawl 133 (Fig. 10) pivoted thereto at 134 and pressed outwardly by a lease spring 135 secured to the rack. The pawl 133 engages over the upper edge of slide 46a in the manner illustrated in Fig. 10, and draws it down to the position of slide 46b, at the same time causing the slide 46a to strike the upper edge of slide 46b and force it down on to the chute 84 whence it is returned to the magazine.

When the slides are conveyed around on the circular track, they are raised on edge and disposed on the rear of the magazine by means of the following mechanism. The portion 85 of the circular track, terminates at the magazine, and the lower portion of the track 86 coincides with the horizontal plate 45 which serves as the bottom of the magazine. When the slide has reached an upper position, carried there by the pushers 89, it rests upon a U-shaped member 136, which is in the same plane as the horizontal plate 45.

When the slide has reached this position, a trip 137 which is carried by the circular gear 87, strikes the end of a lever 138 which is pivoted at 139 and has secured at its other end, a rod 141. Rod 141 has a pivoted connection with a crank 142 which tends to be held in a counter clockwise position by tension spring 143. The crank 142 has as a continuation thereof, a shaft 144 which is journaled in the upright brackets 33 and 34 and has pinned thereto, a pair of arms 145 and 146. At the time the trip strikes the front end of the lever 138, the slide is on the U-shaped member 136, and the arms 145 and 146 being raised by the moving of lever 138, the slide supported thereon is raised to a vertical position in the rear of the magazine, and the group of slides 46 are pressed forwardly against the front plate 43.

When my projecting machine is used for advertising or display purposes so that it is operated continuously for a long period of time, there is a possibility of the mechanism becoming too warm and accordingly I contemplate the use of any suitable cooling apparatus. In the drawings, I show a fan 147 secured to rotate with the motor and cause a circulation of air throughout the casing. I provide a number of ports 148 in suitable places in the outside casing so that cool air may be withdrawn therethrough and caused to circulate over the warmest portions of the apparatus. The fan 147 may be placed in a different position and a belt or other suitable power connection run to the motor, but the arrangement of the fan is bound to vary slightly when the specific design of the invention is at all modified.

The electrical connections to my projecting machine, may be modified considerably, depending upon exactly how it is to be used. If it is to be used entirely as a full automatic advertising device, the switch 42 may be dispensed with and the bulb and motor operated directly from a common source of power. I prefer, however, to make the light and motor circuits separate so the light may be operated without the motor. For this purpose I provide any usual form of plug connection 149, for connecting the light unit to a source of power. The current from the plug 149 is supplied to the switch 42 and also the motor 91. From the switch there is a connection to the lamp base 49, so that the current to the lamp may be controlled independently of the motor. In the line from the plug 149 to the motor, an outlet plug 151 is connected. A control cord is adapted to be connected to the outlet plug 151, so that the operation of the motor can be controlled at a distance, for example by a lecturer. With this arrangement if it is desirable to operate the stereopticon entirely automatically, a permanent connection can be made at the plug 151 so that the motor will at all times be in operation while it is connected to a source of power.

In considering the operation of the stereopticon, assume that it is to be used for the purpose of illustrating a lecture. The lecturer first takes the slides and arranges them in proper order and places them in the magazine. An extension cord for controlling the operation may be placed within the casing by either raising the cover 26 or opening the door 64 in the side 25. This is all of the equipment which the lecturer needs to carry with him and I have made the stereopticon so that fully equipped with slides, it will weigh less than twenty pounds.

When the lecturer reaches his destination, he places the stereopticon at a distance from the screen or curtain and connects it to a source of power at the plug 149. He then lights the lamp 51 and focuses the lenses 71 by adjusting the tubular casing 69, and securing it against movement by the ring nut 76. For the purpose of focusing, an extra slide may be carried or the first slide of the series may be used. An extension is connected to the outlet plug 151 such as shown in Fig. 19. The extension cord 152 has at the end, a push button switch 153 which is adapted to make an electrical connection only while the button 154 is depressed. When the stereopticon is thus set up, the operator is all ready to proceed.

Assume that slide 46b is in position and the lecturer has finished talking about it, and he is ready to move the next slide 46a in position. He presses the button 154 and the motor 91 starts to turn immediately and transmits a rotary motion to the shaft 97 through the pulleys 93 and 95 and the belt 94. This causes a rotation of shaft 102 through the bevel gears 99 and 101, so that the worm 103, drives the worm gear 104 on shaft 105, and actuates the two spur gears 107 and 108 which mesh with the large circular gears 87. The small gear 109 is turned by the shaft 105, and through the reducing gear shown, operates the gear in a counter clockwise direction. The roller 117 travelling in the slot 118, rides toward the pivot 121 and causes a relatively quick downward movement of the lever 119. The short rack 122 also drops downward quickly and through the gear connection described (Fig. 5) causes the racks 132 to be drawn downward relatively quickly.

The pawls 133 being in engagement with slide 46a, draw this slide downwardly and cause it to displace the slide 46b. The slide will remain at whatever downward position the rack pawls place it in, because it is held against the shoulders 82 by the springs 83. When the racks have reached their lowest position, the direction of movement of lever 119 will be changed by the roller sliding to the other end of the slot 118. This end of the slot being farther from the pivot, the upward movement of the rack will be considerably slower. This permits the rack to slide up gradually with the pawls depressed against the face of the next slide, and gently hook over the top edge thereof when the rack has reached its upper position.

While the rack is returning upwardly to engage the next slide, the slide that has just been ejected from projecting position is being returned to the rear of the magazine. It initially drops on to the chute 84 and slides down by gravity to the lower portion of the circular track where it occupies a position such as the slide 46c in Fig. 3. The circular gears 87 being at this time driven by the gears 107 and 108, the pushers 89 will quickly overtake the slide 46c and convey it around the circular track to a position on the U-shaped member 136. When the slide is in this position, one of the trips 137 which is located a proper distance behind the pusher on the gear 87, strikes the free end of lever 138 and pulls the rod or link 141 against the action of spring 143. This causes the arms 146 to be raised upwardly with the coincidental rotation of shaft 144 and the plate is therefore raised to a vertical position in the rear of the magazine as shown by the slide 46d as illustrated in Fig. 3. This slide is subsequently held in upright position by the springs 81, and the arms 146 then return to their normal position by reason of gravity and also, the operation of tension spring 143. The entire group of slides is pushed forwardly by the arms 146 so that by the time the long racks reach their extreme upward travel, slide 46a will be in position to be engaged by the pawls 133.

This action is continuous when the stereopticon is operated full automatically. In a machine such as shown in the drawings, it requires about ten seconds for the racks to be raised to their extreme upward position, so that at any time within a space of ten seconds after a new slide has been brought to position, the button 154 may be released. This gives all the margin of time that is necessary for a lecturer to control the operation of the slides himself without need of an assistant.

Any usual kind of glass slides may be used with my stereopticon and there is little danger of scratching because the shoulders 82 engage the marginal edge of the slide, and these shoulders are machined so that they will be nice and smooth and the slide will move along freely thereon. I prefer however, to employ the type of slide indicated in Fig. 18, in which two thicknesses of glass are provided and the image is placed between them, the two sections of glass being held together by a band 46' which may be thin metal, paper, bakelite, or other suitable binding substance.

I may provide means for adjusting the position of the slide retaining magazine springs 81 and also the point of pivot of the arms 146, so that the number of slides adapted to be held by the magazine may be varied. This adjustable feature can be arranged with the springs 81 by simply moving them along the plates 33 and 34 and securing them in place by any suitable means. The position of the shaft 144 may be modified by providing a number of journals therefor and making the length of the rod 141 adjustable. For all practical purposes however, I provide space for the maximum number of slides which are apt to be required for lecture or display purposes, and then if a smaller number are required at a given lecture, a number of blank slides can be put in the magazine behind the live slides to fill up space.

The speed with which the slides are changed, will be determined to some extent by whether the stereopticon is employed full automatically, or semi-automatically, as for lecture purposes. The speed at which the mechanism is driven may be varied by changing the belt 94. To a certain extent also, slight variations in electrical current causing the motor to run faster or slower, may be compensated for by means of this belt and pulley assembly.

In order to make the details of the invention clear so that it will be readily understandable to those skilled in the art, I have described in detail, a specific embodiment thereof. It is obvious however, that I do not restrict myself to this particular form and the invention is limited only by the scope of the appended claims.

What I claim as new and desire to secure by United States Letters Patent is:

1. In an automatic projecting machine, means for forming a projecting beam of light, a magazine for a plurality of slides above the beam of light, a rack mechanism for removing the foremost slide from the magazine and placing it in the path of the light beam in projecting position, a circular track extending around the source of said light beam and communicating with the magazine, means for ejecting a slide onto the track, means for conveying the ejected slide around the track to the rear of the magazine, and means for removing the slide from the track and placing it in vertical position in the rear of said magazine.

2. In an automatic projecting machine, means for forming a projecting beam of light, a magazine for a plurality of slides above the beam of light, means for moving the foremost slide vertically into the path of the beam, means for moving the next foremost slide into the path of the beam so that its lower edge strikes against the top edge of the first slide to eject said first slide, and means for returning the ejected slide into upright position at the rear of the magazine.

3. In an automatic projecting machine means for forming a projecting beam of light, a magazine for a plurality of slides above the beam, a pair of vertically reciprocable racks with a spring pressed pawl at the top thereof adapted to engage the top edge of the foremost slide in the magazine and lower it to a position in the path of the light beam, a circular track extending around the light beam and communicating with the magazine, so that a slide ejected from a projecting position by an advancing slide will drop on to said circular track, means for conveying the slide around the track to the rear of the magazine and means for removing the slide from the track and placing it in a vertical position in the rear of the magazine.

4. In an automatic projecting machine, means for forming a projecting beam of light, a magazine for a plurality of slides above the beam, a pair of vertically reciprocable racks with a spring pressed pawl at the top thereof adapted to engage the top edge of the foremost slide in the magazine and lower it to a position in the path of the light beam, means for operating said racks to have a relatively slow upward movement and a relatively quick downward movement, a circular track extending around the light beam and communicating with the magazine, so that a slide ejected from a projecting position by an advancing slide will drop on to said circular track, means for conveying the slide around the track to the rear of the magazine and means for removing the slide from the track and placing it in a vertical position in the rear of the magazine.

5. In an automatic projecting machine, means for forming a projecting beam of light, a magazine for a plurality of slides above the beam of light, a rack mechanism for removing the foremost slide from the magazine and placing it in the path of the light beam in projecting position, a circular track extending around the source of said light beam and communicating with the magazine, means for placing the ejected slide on the track, means for conveying the slide around the track to the rear of the magazine, means for removing the slide from the track and placing it in vertical position in the rear of said magazine, a motor, a gear mechanism for operating the rack mechanism and slide restoring mechanism, and variable speed connection between the motor and said gear mechanism.

6. In an automatic projecting machine, means for forming a projecting beam of light, a magazine for a plurality of slides above the beam of light, a vertical track with spring slide holding means, a rack mechanism for removing the foremost slide from the magazine and lowering it along the track into the path of the light beam, a circular track extending around the source of said light beam and communicating with the magazine, means for ejecting a slide and placing the ejected slide on the track, means for conveying the slide around the track to the rear of the magazine, and means for removing the slide from the track and placing it in vertical position in the rear of said magazine.

7. In an automatic projecting machine, means for forming a projecting beam of light, a magazine for a plurality of slides above the beam of light, a rack mechanism for removing the foremost slide from the magazine and placing it in the path of the light beam in projecting position, a circular track extending around the source of said light beam and communicating with the magazine, means for ejecting a slide and placing the ejected slide on the track, a large gear disposed adjacent the circular track with a pusher thereon adapted to engage an ejected slide and push it around the circular track to the rear of the magazine, an arm for lifting the plate from the track and tilting it upwardly to the rear of the magazine, and means carried by said gear for operating said arm when the slide has reached a position adjacent thereto.

8. In a projection machine a source of light, lenses for converting the light into a beam and projecting it from the machine, a magazine disposed above the source of light, a vertical guide-way for slides from the front of the magazine past the light beam, a circular track from the bottom of the guideway to the back of the magazine and extending around the light source, springs for holding a plate on the guideway in the path of said beam, means for withdrawing the foremost plate from the magazine and lowering it vertically into projecting position so that the first plate is pushed downwardly and drops onto said circular track, means for advancing the plate around the circular track to the rear of the magazine, and means for tilting it up to a vertical position at the rear of the magazine.

In witness whereof, I hereunto subscribe my name this 27th day of April, 1927.

JOHN F. STUBNER.